March 22, 1927.  1,621,734
C. M. McCORD
BEARING RACE AND BUSHING REMOVER
Filed Nov. 7, 1925
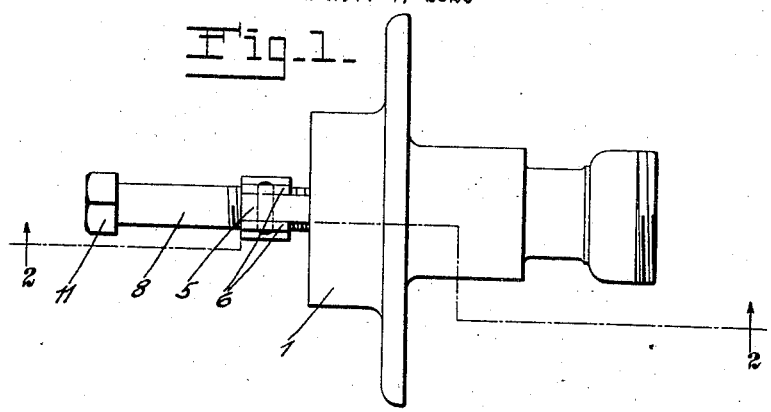
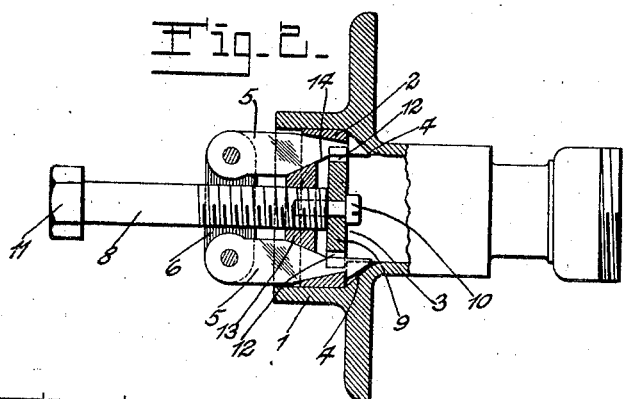
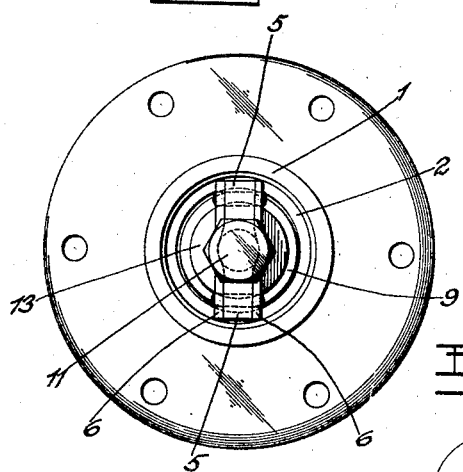
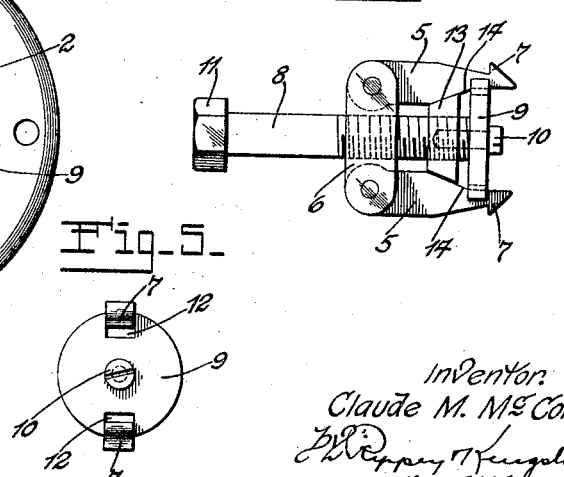
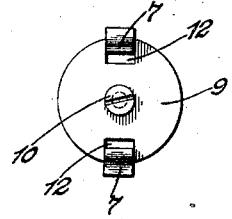
Inventor:
Claude M. McCord,
His Attorneys.

Patented Mar. 22, 1927.

1,621,734

UNITED STATES PATENT OFFICE.

CLAUDE M. McCORD, OF RICHMOND HEIGHTS, MISSOURI.

BEARING RACE AND BUSHING REMOVER.

Application filed November 7, 1925. Serial No. 67,570.

This invention relates to improvements in devices for removing bearing races and bushings and the like from the parts in which they are mounted.

An object of the invention is to provide a device for removing bearing races, bushings, and the like from the parts in which they are rigidly mounted, comprising elements engageable with the bearing race or bushing, and a device for moving said elements radially in opposite directions into engagement with the bearing race or bushing, and actuating the same in a direction to force the bearing race or bushing from within the part in which it is mounted.

Another object of the invention is to provide a device of the character and for the purpose mentioned, comprising a pair of parts arranged to be extended through the race or bushing and moved radially outwardly into engagement therewith, and means for moving said parts radially outwardly into engagement with the race or bushing and then longitudinally withdraw the race or bushing from the support in which it is mounted.

Other objects of the invention will appear from the following description taken in connection with the accompanying drawing, in which—

Fig. 1 shows the device extending into the bearing race or bushing support,

Fig. 2 is a sectional view on the line 2—2 of Fig. 1,

Fig. 3 is an end elevation of the device in the relationship shown in Fig. 1,

Fig. 4 is a side elevation of the device per se, and

Fig. 5 is an inner end elevation of the device.

The invention is shown applied for one of the uses for which it is intended, which is for the removal of the outer bearing race from a type of automobile hubs, although it will be understood from the following description that the use of the device is not restricted to this purpose. As shown, the hub casting comprises a tubular part 1 in which an anti-friction bearing race 2 is rigidly secured against an internal shoulder 3. In this type of hub the shoulder 3 is provided with a pair of diametrically opposite notches 4 for the reception of the end of a tool or implement for driving the race 2 from the part 1 of the hub. Due to the length of the hub the operation of removing the bearing race 2 therefrom by use of existing devices provided for that purpose is tedious and difficult. My invention facilitates and expedites the removal of the bearing race from the hub.

As shown, a pair of arms 5 are rigidly connected at one end by spaced links 6, permitting spreading and converging of the opposite ends of said arms, the opposite end of each of which is notched to provide an outwardly extending hook 7.

A bolt 8 has an abutment 9 detachably and rotatively secured to its inner end by a screw 10, so that the bolt may be turned independently of the abutment, and vice versa. The outer end of the bolt is provided with a head or handle 11 whereby the bolt may be manually or mechanically rotated. The abutment 9 is provided with a pair of diametrically opposite notches 12 through which the arms 5 extend when the device is in use, and which permit sufficient inward radial movement of the free ends of the arms 5 for the hooks 7 to pass through the race 2 and to engage the inner end of said race by seating in the notches 4, while the abutment 9 bears against the shoulder 3 of the hub.

A cone nut 13 is screwed on the bolt 8 and when adjacent to or against the abutment 9 permits the described inward adjustment of the arms 5 so that the hooks 7 can pass through the race 2. The arms 5 are provided with cam surfaces 14 for engagement by the cone nut so that when the bolt 8 is rotated in a direction to screw the nut outwardly thereon the nut will spread the arms 5, causing the hooks 7 to engage the inner end of the race 2. As inward movement of the bolt 8 is prevented by engagement of the abutment 9 against the shoulder 3, and as further spreading of the arms 5 is prevented by their engagement against the race 2, continued rotation of the bolt 8 will force the arms 5 longitudinally toward the end 11 of the bolt, drawing the race 2 from the hub. This is because when the parts are positioned as shown in Fig. 2, the cam surfaces 14 serve as abutments or shoulders against which the cone nut 13 pushes, resulting in the arms 5 being pushed outwardly and drawing with them the race 2. After the race has been withdrawn from the hub the nut 13 may be moved in a direction to permit inward converging movements of the arms 5 and their disconnection from the race.

This device has been found highly efficient and practicable in use and greatly facilitates the withdrawal of the bearing races from the hubs, and may be applied to various similar uses. The construction and arrangement of the parts may be varied within equivalent limits without departure from the nature and principle of the invention.

I claim:

1. A device for removing a bearing ring element from a support, comprising an abutment arranged to bear against the support, a rotative threaded bolt bearing against said abutment, a pair of arms arranged to engage the ring element to be removed from said support, and a tapered body screwed on the bolt and operative thereby to spread said arms apart into engagement with said removable element and then to move said arms and thereby said ring element longitudinally from said support.

2. A device for removing a bearing ring element from a support, comprising a bolt, a pair of arms arranged to engage with the ring element to be removed, a tapered body screwed on the bolt and operative thereby to spread said arms apart into engagement with said ring element and to move said arms and thereby said ring element longitudinally from the support, an abutment for the end of the bolt arranged to bear against said support, and means for holding said abutment in connection with said bolt.

3. A device for removing a bearing ring element from a support, comprising a bolt, a tapered body screwed on the bolt, a pair of pivotally connected arms embracing said body between them and arranged to be operated by said body into engagement with the ring element and to be moved by said body longitudinally to withdraw the ring element from the support, and an abutment connected to the end of the bolt arranged to bear against said support and engaging said arms.

4. A device for removing a bearing ring element from a support, comprising a bolt, a pair of arms arranged to engage with the ring element, a tapered body screwed on the bolt and operated thereby to spread said arms into engagement with the ring element and to move said arms and thereby the ring element longitudinally from the support, an abutment for the end of the bolt arranged to bear against said support, and means pivotally securing said abutment in connection with the bolt.

5. A device of the character described comprising a threaded bolt, a pair of arms arranged to move radially toward and away from the bolt, parts in connection with said arms arranged to engage a bearing race or bushing, means operated by the bolt for moving said arms radially outwardly into engagement with the bearing race or bushing, and then longitudinally to withdraw the bearing race or bushing from a support, and an element for holding the bolt from longitudinal movement between said arms during withdrawal of the bearing race or bushing.

CLAUDE M. McCORD.